（12） United States Patent
Ndu et al.

(10) Patent No.: US 11,636,209 B2
(45) Date of Patent: Apr. 25, 2023

(54) DATA STRUCTURE MEASUREMENT COMPARISON

(71) Applicant: Hewlett Packard Enterprise Development LP, Houston, TX (US)

(72) Inventors: Geoffrey Ndu, Bristol (GB); Ludovic Emmanuel Paul Noel Jacquin, Bristol (GB); Nigel Edwards, Bristol (GB)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/464,832

(22) Filed: Sep. 2, 2021

(65) Prior Publication Data

US 2021/0397709 A1 Dec. 23, 2021

Related U.S. Application Data

(62) Division of application No. 15/873,419, filed on Jan. 17, 2018, now Pat. No. 11,138,315.

(51) Int. Cl.
*G06F 21/56* (2013.01)
*G06F 21/44* (2013.01)
*G06F 21/57* (2013.01)
*G06F 21/53* (2013.01)

(52) U.S. Cl.
CPC ............ *G06F 21/567* (2013.01); *G06F 21/53* (2013.01); *G06F 21/566* (2013.01); *G06F 21/568* (2013.01); *G06F 21/57* (2013.01); *G06F 21/44* (2013.01)

(58) Field of Classification Search
CPC ...... G06F 21/567; G06F 21/53; G06F 21/566; G06F 21/568; G06F 21/57; G06F 21/44

USPC .......................................................... 726/22
See application file for complete search history.

(56) References Cited

U.S. PATENT DOCUMENTS

| 7,904,278 | B2 | 3/2011 | Wilson et al. |
| 8,321,931 | B2 | 11/2012 | Zimmer et al. |
| 8,341,287 | B2 | 12/2012 | Khemani et al. |
| 9,177,153 | B1 | 11/2015 | Perrig et al. |
| 9,465,943 | B2 | 10/2016 | Paris et al. |
| 9,703,725 | B2 * | 7/2017 | Berke ................. G06F 12/0828 |

(Continued)

FOREIGN PATENT DOCUMENTS

| CN | 103502992 A | 1/2014 |
| CN | 104778141 A | 7/2015 |

(Continued)

OTHER PUBLICATIONS

Intel Corporation, "Intel 64 and IA-32 Architectures Software Developer's Manual", vol. 2 (2A, 2B, 2C & 2D), Instruction Set Reference, A-Z, Order No. 325383-060US, Sep. 2016, 2198 pages.

(Continued)

*Primary Examiner* — Dereena T Cattungal
(74) *Attorney, Agent, or Firm* — Trop, Pruner & Hu, P.C.

(57) ABSTRACT

A system comprising an inner kernel of an operating system (OS) running at a higher privilege level than an outer kernel of the OS, the inner kernel to measure a data structure in a memory; a device including a measurement engine to measure the data structure in the memory, wherein the device operates independently of the OS; and a trusted execution environment including an application to compare measurements from the inner kernel and the measurement engine.

10 Claims, 5 Drawing Sheets

(56) References Cited

U.S. PATENT DOCUMENTS

| | | |
|---|---|---|
| 10,404,463 B1 | 9/2019 | Rodriguez De Castro |
| 10,659,237 B2* | 5/2020 | Wu .................... G06F 21/70 |
| 10,885,211 B2 | 1/2021 | Teal |
| 10,924,282 B2 | 2/2021 | Brostrom |
| 11,023,586 B2 | 6/2021 | Bhatia et al. |
| 2006/0236122 A1 | 10/2006 | Field et al. |
| 2007/0043896 A1 | 2/2007 | Daruwala et al. |
| 2008/0015808 A1* | 1/2008 | Wilson ................ G06F 21/51 702/123 |
| 2009/0222910 A1 | 9/2009 | Le et al. |
| 2010/0115625 A1 | 5/2010 | Proudler |
| 2012/0185683 A1 | 7/2012 | Krstic et al. |
| 2013/0227264 A1 | 8/2013 | Kim et al. |
| 2015/0089209 A1* | 3/2015 | Jacobs ................ G06F 21/575 713/1 |
| 2015/0150127 A1* | 5/2015 | Ning .................... G06F 21/57 726/22 |
| 2016/0232354 A1* | 8/2016 | Fraser ................ G06F 21/554 |
| 2017/0011219 A1 | 1/2017 | Li et al. |
| 2017/0024238 A1* | 1/2017 | Hiremane ............ G06F 21/575 |
| 2017/0235946 A1 | 8/2017 | Potlapally et al. |
| 2017/0359370 A1 | 12/2017 | Humphries et al. |
| 2018/0063092 A1* | 3/2018 | Ollikainen .......... H04L 63/0428 |
| 2018/0211042 A1 | 7/2018 | Reinecke |
| 2018/0364522 A1* | 12/2018 | Yamaguchi ....... G02F 1/133514 |
| 2018/0365422 A1* | 12/2018 | Callaghan ............ G06F 21/575 |
| 2019/0095345 A1* | 3/2019 | Zmudzinski ........ G06F 12/1441 |
| 2020/0364340 A1* | 11/2020 | Khoruzhenko ........ G06F 21/57 |

FOREIGN PATENT DOCUMENTS

| | | |
|---|---|---|
| CN | 106127056 A | 11/2016 |
| CN | 106407816 A | 2/2017 |
| EP | 2656272 A2 | 10/2013 |
| WO | 2012/088029 A2 | 6/2012 |
| WO | 2016/192056 A1 | 12/2016 |

OTHER PUBLICATIONS

Aumasson et al., "SGX Secure Enclaves in Practice-Security and Crypto Review", Black Hat USA, 2016, 10 pages.

Cloud Security Alliance, "Best Practices for Mitigating Risks in Virtualized Environments", Apr. 2015, 35 pages.

Dolan-Gavitt et al., "Virtuoso: Narrowing the semantic gap in virtual machine introspection", SP '11 Proceedings of the 2011 IEEE Symposium on Security and Privacy, 2011, pp. 297-312.

Etsi, "Network Functions Virtualisation (NFV); NFV Security; Security and Trust Guidance" ETSI GS NFV-SEC 003, V1.1.1, Dec. 2014, 57 pages.

European Search Report and Search Opinion Received for EP Application No. 18212731.6, dated May 14, 2019, 8 pages.

Intel Software, "Register Your Production Enclave", Intel SGX, available online at <https://web.archive.org/web/20190424165514/https://software.intel.com/en-us/sgx/request-license>, Apr. 24, 2019, 4 pages.

Johnson et al. "Intel software guard extensions: EPID provisioning and attestation services." Intel Corporation, 2016, 10 pages.

Pendergrass, et al., "LKIM: The Linux Kernel Integrity Measurer", Johns Hopkins APL technical digest 32.2 (2013), pp. 509-516.

Rao, Dinesh, "Intel® SGX Product Licensing", Intel® SGX, Feb. 28, 2016, 2 pages.

Wang, J. et al., "A Dependability Analysis of Hardware-assisted Polling Integrity Checking Systems," (Research Paper), 2012, http://nsl.cs columbia.edu/projects/minestrone/papers/Analysis_DSN_12.pdf.

Wikipedia, "Southbridge (computing)", available online at <https://en.wikipedia.org/w/index.php?title=Southbridge_(computing)&oldid=785712787>, Jun. 15, 2017, 2 pages.

* cited by examiner

DATA STRUCTURE MEASUREMENT COMPARISON

CROSS-REFERENCE TO RELATED APPLICATION

This application is a Divisional application of U.S. application Ser. No. 15/873,419, filed on Jan. 17, 2018, the content of which are incorporated herein by reference in its entirety. The Applicant hereby rescinds any disclaimer of claim scope in the parent application or the prosecution history thereof and advices the USPTO that the claims in this application may be broader than any claim in the parent application.

BACKGROUND

Computing devices may utilize runtime integrity software, such as runtime integrity agents, to detect malicious programs. The runtime integrity software may execute in the same space as the components that are monitored, thus the runtime integrity software may be exposed to the same risks posed by the malicious programs.

BRIEF DESCRIPTION OF THE DRAWINGS

Non-limiting examples of the present disclosure are described in the following description, read with reference to the figures attached hereto and do not limit the scope of the claims. In the figures, identical and similar structures, elements or parts thereof that appear in more than one figure are generally labeled with the same or similar references in the figures in which they appear. Dimensions of components and features illustrated in the figures are chosen primarily for convenience and clarity of presentation and are not necessarily to scale. Referring to the attached figures:

DETAILED DESCRIPTION

In the following detailed description, reference is made to the accompanying drawings which form a part hereof, and in which is depicted by way of illustration specific examples in which the present disclosure may be practiced. It is to be understood that other examples may be utilized and structural or logical changes may be made without departing from the scope of the present disclosure.

Computing devices may utilize runtime integrity software, such as runtime integrity agents, to detect malicious programs. The runtime integrity software may execute in the same space as the components that are monitored, thus the runtime integrity software may be exposed to the same risks posed by the malicious programs.

Examples described herein include a computing devices that may utilize a split kernel operating system (OS), a device (for example, a baseboard management controller (BMC)) operating independent of the computing devices OS, and an application operating in a trusted execution environment at the application level of the OS.

As noted, one example may utilize a split kernel OS. The split kernel OS may include an inner kernel and an outer kernel. The inner kernel may operate at a higher privilege level than that of the outer kernel. The kernel space for the inner kernel may include a defined, pre-set, and protected area of memory. The kernel space for the inner kernel may be static. In other words, the inner kernel may be a static kernel, rather than a self-modifying kernel. Thus the data structure in memory of the inner kernel (in other words, the inner kernels kernel space) may be known. The inner kernel may include machine-readable instructions, which execute in response to a request from the application operating in the trusted execution environment, measure the data structure in memory of the inner kernel (in other words, the inner kernels kernel space) and send the results to the application operating in the trusted execution environment. Since the measurement of the data structure in memory of the inner kernel may be known ahead of time and be a constant value, any change in value may indicate malicious activity or a malicious program.

As noted, one example may utilize a device operating independently of the computing devices OS. As noted, the device may be a BMC. The device may be any other microcontroller, circuit, or similar device that operates independently of the OS. The device may include a measurement engine. The measurement engine may measure a data structure in memory. In other words, the measurement engine may scan a data structure in memory. In an example, the data structure in memory may be the inner kernels kernel space. Since the device operates independently from the computing devices OS, if the inner kernel is compromised, the device may not be comprised. The device may measure the data structure and in response to a request from the application operating in the trusted execution environment, the device may send the measurement to the application operating in the trusted execution environment. The device may also send a heartbeat signal to the application operating in the trusted execution environment. In response to a failure to receive a response from the application operating in the trusted execution environment, the device may take remedial action.

As noted, one example may utilize an application operating in a trusted execution environment in the OS. The application may operate at the application level or layer of the OS. The application may operate in a trusted execution environment. The trusted execution environment may also be referred to as a protected execution environment. Examples of a trusted execution environment include ARM TrustZone and Intel Software Guard Extensions (SGX). The trusted execution environment may protect the application with regards to integrity and confidentiality. The application may request measurements of the data structure in memory periodically from the device and from the inner kernel. Upon reception of the measurements from the device and the inner kernel, the application may compare the measurements. In response to a mismatch in measurements from the device and from the inner kernel, the application may take remedial action. Remedial action may include a system restart or reboot, a system re-image, or the like. The application may receive a heartbeat signal from the device. In response to the reception of a heartbeat signal, the application may send a response to the device to indicate that the application has not been tampered with.

The co-operation of all the examples described above may ensure that the computing device or system may be operating without compromise of critical or core functions and machine-readable instructions (e.g., the inner kernel). Each example described above may be a lightweight component and may not utilize large effort or, in other words, processing power.

Accordingly, various examples provided herein may include a system. The system may comprise an inner kernel of an OS running at a higher privilege level than an outer kernel of the OS, the inner kernel to measure a data structure in a memory; a device including a measurement engine to measure the data structure in the memory, wherein the device operates independently of the OS; and a trusted execution environment in the OS including an application to compare measurements from the inner kernel and the measurement engine.

Figure 1:
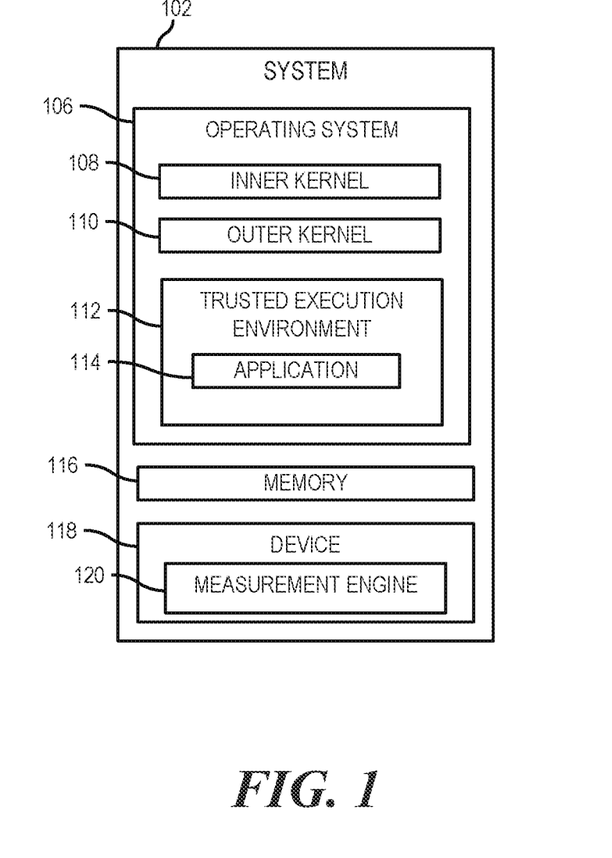
FIG. 1 is a block diagram of a system including a memory, a device with a measurement engine, and an operating system with an inner kernel, outer kernel, and an application executing in a trusted execution environment, according to one example.

FIG. 1 is a block diagram of a system 102 including a memory 116, a device 118 with a measurement engine 120, and an OS 106 with an inner kernel 108, outer kernel 110, and an application 114 executing in a trusted execution environment 112, according to one example. The system 102 may include an OS 106. The OS 106 may be machine-readable instructions stored in a non-transitory machine readable storage medium. A processor of the system 102 may execute the machine-readable instructions stored in the non-transitory machine readable storage medium. The OS 106 may be a split kernel OS. In such examples, the OS 106 may include an inner kernel 108 and an outer kernel 110. The inner kernel 108 and outer kernel 110 may operate in separate data structures in memory 116. Stated another way, the inner kernel 108 and outer kernel 110 may operate in separate kernel spaces. The inner kernels 108 kernel space may be a pre-set, small, and critical area of the data structure in memory 116. The inner kernel 108 may take measurements of the data structure in memory 116. In other words, the inner kernel 108 may measure the inner kernel 108 space. A processor of the system 102 may provide a trusted execution environment 112. Applications operating in the application layer of the OS 106 may utilize the trusted execution environment 112. The trusted execution environment 112 may ensure applications operating inside the trusted execution environment 112 are protected from malicious programs. The trusted execution environment 112 does not allow any application or kernel level machine-readable instructions from altering, affecting, or accessing the applications operating in the trusted execution environment 112. The system 102 may include a device 118. The device 118 may operate independently of the OS 106 of the system 102. The device 118 may include a measurement engine 120. The measurement engine 120 may measure the data structure in memory 116. In other words, the measurement engine 120 of the device 118 may measure the inner kernels 108 kernel space. The measurement engine 120 of the device 118 may scan or measure the data structure in memory 116 periodically or continuously.

As used herein, a "computing device" may be a storage array, storage device, storage enclosure, server, desktop or laptop computer, computer cluster, node, partition, virtual machine, or any other device or equipment including a controller, a processing resource, or the like. In examples described herein, a "processing resource" may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) to retrieve and execute instructions, other electronic circuitry suitable for the retrieval and execution instructions stored on a machine-readable storage medium, or a combination thereof.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Any machine-readable storage medium described herein may be non-transitory.

As used herein, a "device" may be any microcontroller, BMC, circuit, CPU, microprocessor, GPU, FPGA, chassis manager, rack level manager, server, other electronic circuitry suitable to measure data structures in memory and send heartbeat signals and operating independently of an OS, or a combination thereof. For example, the device may be a BMC of a server. In another example, the device may be a top of rack switch or management module. In such examples, the device may operate independently of each system within the racks OS. In such examples, the device may take the measurements of each systems data structure in each systems memory.

As used herein, a "heartbeat signal" may be a periodic signal generated by hardware or machine-readable instructions. A device may utilize the heartbeat signal to determine whether another device or component is functioning properly and/or to keep another device or component in synchronization. When a heartbeat signal is sent, the device or component receiving the heartbeat signal may be expected to send a response to acknowledge that the device or component is operating properly.

As used herein, a "Baseboard Management Controller" or "BMC" is a specialized service processor that monitors the physical state of a server or other hardware using sensors and communicates with a management system through an independent "out-of-band" connection. The BMC may also communicate with applications executing at the OS level through an input/output controller (IOCTL) interface driver, a Representational state transfer (REST) application program interface (API), or some other system software proxy that facilitates communication between the BMC and applications. The BMC may have hardware level access to hardware devices located in a server chassis. The BMC may be able to directly modify the hardware devices. The BMC may operate independently of the OS of the system that the BMC is located in. The BMC may be located on the motherboard or main circuit board of the server or other device to be monitored. The fact that a BMC is mounted on a motherboard of the managed server or otherwise connected or attached to the managed server does not prevent the BMC from being considered "separate". As used herein, a BMC has management capabilities for sub-systems of a computing device, and is separate from a processing resource that executes an OS of a computing device. The BMC is separate from a processor, such as a central processing unit, executing a high level OS or hypervisor on a system.

As used herein, an "operating system" or "OS" is machine-readable instructions that may be stored in a machine-readable storage medium and executed by a processing resource. An OS may include system software that manages computer hardware and software resources, as well as providing common services for computer programs. The OS may facilitate communications between a computing devices hardware and applications. The OS may include a user interface that allows a user to interact with the computing device. The OS may include layers, such as an application layer and a kernel layer. High level applications (as in, applications that a user may interact with) may execute at the application layer of an OS, while the kernel layer may include machine-readable instructions that control the computing devices hardware. During the setup or initialization of a computing device, an OS may be installed. During a computing devices boot or start-up process, the OS may load into a machine-readable storage medium. As noted above, a processor or processing resource of the computing device may execute the OS from the machine-readable storage medium.

As used herein, a "trusted execution environment" may be an area located in a processor that ensures machine-readable instructions loaded into the area are executed confidentially. The trusted execution environment may ensure the machine-readable instructions integrity, in the instance of malicious programs tampering with a computing devices kernel. Applications executing in the trusted execution environment may not be accessible by other users, applications, processes, services, and the like. Firmware or software may establish the trusted execution environment. A third party may establish the authenticity of applications executing in the trusted execution environment. A third party may include a remote attestation server or a local device operating independently of an OS, such as a BMC.

As used herein, a "kernel" may be a part of the OS. The kernel may be the part of the OS that provides the most basic level of control over all of the computer's hardware devices. The kernel may manage memory accesses, allot hardware resources, manage the processing resources operating states, and manage data. An OS may include a single, self-modifying kernel. In other words, the kernel may be dynamically modified while operating. In such examples, sections of the machine-readable instructions of the kernel may be included or excluded. In another example, the OS may include two kernels. In other words, the OS may be a split kernel OS. One kernel may be static, while the other may be self-modifying.

A kernel space may be a part of a virtual memory of a computing device. The virtual memory may map virtual addresses of a program into physical addresses in computer memory of computing device, such as a machine-readable storage medium or other memory device. A processor of the computing device may segregate the virtual memory of the computing device into the kernel space and a user space. For example, the kernel space may be reserved for running the kernel, kernel extensions, and device drivers. The user space, in contrast, may be the memory area where applications and services are executed.

Furthermore, the kernel space may be divided into an inner region (as in, inner kernel) and an outer region (as in, outer kernel). The inner portion of the kernel may be loaded in the inner region, and the outer portion of the kernel may be loaded in the outer region. The inner portion may, in some examples, have direct access to the hardware of computing device. In contrast, a virtual memory interface may be presented to the outer portion, which may not have direct access to privileged portions of the hardware, such as a memory management unit. The security goals of the kernel division are integrity guarantees for kernel code and critical data along with kernel control flow integrity, and information flow control enforcement across processes within the kernel.

For example, the inner portion of the kernel (e.g., inner kernel) may include a memory management unit, a process management unit, and architecture specific code. The memory management unit may be a hardware unit that manages virtual memory and performs translation of virtual memory addresses to physical memory addresses. The process management unit may manage the data structures for processes running on the operating system. The architecture specific code may be custom instructions that modify an existing kernel to implement an example kernel architecture described herein. The inner kernel may manage communication with the outer portion of the kernel by providing a restricted API which may be accessible to any outer kernel component. The inner kernel may be static (as in, not self-modifying).

In some examples, the outer portion of the kernel (e.g., outer kernel) may include all other components of the kernel not included in the inner portion. For example, the outer portion may include a file systems unit and a device driver unit. The file systems unit may provide an abstraction of files to user space programs. For example, the file systems unit may communicate with other outer kernel components including the device driver unit. The device driver unit may provide interfaces for hardware devices, which may enable the operating system to access hardware functions. The outer kernel may be self-modifying (as in, to improve efficiency of the outer kernel, the outer kernel itself may load modules or patch read-only code (to include/exclude code) all while continuing to execute).

In some examples, the kernel space may be divided into the inner region, which loads the inner portion of the kernel, and the outer region, which loads the outer portion of the kernel, by nested page tables. The inner portion of the kernel may be mapped in an inner page table, which may have controlled access from the outer portion of the kernel and any processes running on the outer portion of the kernel. For example, the inner portion may be inaccessible, read-only, or a combination of both. The outer portion, on the other hand, may be mapped in an outer page table, which may map directly to physical memory, but the nested structure of the inner page table and the outer page table controls the access to the inner portion of the kernel. As a result, in some examples, an attempt to write the inner portion of the kernel by the outer portion of the kernel may cause a violation if the access is read-only or inaccessible. Furthermore, the mapping from the outer page table to physical memory may be controlled by the inner portion of the kernel through the inner page table. The mapping of the outer portion of the kernel and its processes' virtual memory to physical memory may thus be under the complete control of the inner portion of the kernel.

It should be noted that the inner portion of the kernel and the outer portion of the kernel may, in some examples, be loaded initially as a single kernel image. The processes of the kernel may then be dynamically transitioned into their respective portions. The entire kernel may share the same code base but attempts to access privileged functionality, such as those restricted to the inner portion of the kernel, from the outer portion of the kernel may cause a violation.

As used herein, a "known good image" may be a backup or copy of the last snapshot of a computing device that was functioning properly. In other words, the known good image may include versions of firmware, drivers, and other applications operating on the computing device at a time when the computing device was functioning properly.

As used herein, a "cryptographic hash function" may be a function comprising machine-readable instructions. The cryptographic hash function may include machine-readable instructions that, when executed by a processor, may receive an input. The cryptographic hash function may then generate a hexadecimal string to match the input. For example, the input may include a string of data (for example, the data structure in memory denoted by a starting memory address and an ending memory address). In such an example, based on the string of data the cryptographic hash function outputs a hexadecimal string. Further, any minute change to the input may alter the output hexadecimal string. In another example, the cryptographic hash function may be a secure hash function (SHA), any federal information processing standards (FIPS) approved hash function, any national institute of standards and technology (NIST) approved hash function, or any other cryptographic hash function.

As used herein, a "trusted platform module" or "TPM" may be an integrated circuit built into a motherboard of a computing device. The TPM may be tamper resistant or tamper proof. The TPM may be utilized for services on the computing device. The services may include device identification, authentication, encryption, measurement, determine device integrity, secure generation of cryptographic keys, remote attestation, and sealed storage. The TPM may include platform configuration registers (PCRs). The PCRs may store security relevant metrics.

As noted above, FIG. 1 illustrates an OS 106 including an inner kernel 108 and an outer kernel 110. Stated another way, the OS 106 may be a split kernel OS. In such examples, the inner kernel 108 may operate at a higher privilege level than the outer kernel 110. In other words, the outer kernel 110 may not access or alter the inner kernel 108 in any way, since the inner kernel 108 may be operating at a higher privilege level. Further and as described above, the inner kernel 108 may be reserved for core and/or critical functions. The inner kernel 108 may operate in a defined or pre-set kernel space. The amount of memory utilized for an inner kernel 108 may be static, known, or pre-determined. The inner kernel 108 may include machine-readable instructions, that when executed, measure the inner kernels 108 kernel space. In other words, the inner kernel 108 may include machine-readable instructions, that when executed, measure the data structure in memory 116 that the inner kernel 108 occupies. As the size and contents of the data structure in memory 116 may be static, the measurement may be a known value. In another example, the measurement of the data structure in memory 116 may include the size of the inner kernel 108. In another example, the measurements may include data measured based on a range of given memory addresses. In such examples, the inner kernel space or the data structure in memory 116 where the inner kernel 108 operates may be defined by a specific and known set of memory addresses. In another example, the measurement may include the output of a cryptographic hash function. In such examples, the cryptographic hash function may take the memory addresses of the inner kernel 108 as an input. The cryptographic hash function may output a hexadecimal string based on the data in the memory addresses. In such examples, the device's 118 measurement engine 120 and the inner kernels 108 measurement engine may include the cryptographic hash function. In such examples, the input, for the cryptographic hash function of the device 118 and inner kernel 108, may be the memory addresses of the data structure in memory 116 (e.g., the inner kernel space). A compromise may be indicated if the output of the cryptographic hash function of the device 118 and inner kernel 108 do not match.

In an example, the application 114 may read platform configuration registers (PCRs) from a trusted platform module (TPM), or some other integrated circuit offering similar functionality, during system 102 boot or startup. In such examples, the application 114 may include embedded known good values of the PCRs. In the event that the embedded values and the known good values do not match, the application 114 may initiate remedial actions, such as a system 102 restart with a last known good image or some other remedial action. In another example, in response to a longer than normal system 102 boot or startup, the application 114 may take remedial action, such as a system 102 restart with a known good image or some other remedial action. Further, the device 118 may notify the application 114 of the longer than normal system 102 boot or startup time.

In further examples, since the amount of memory utilized for the inner kernel 108 may be static, the application 114 may request an initial measurement from the inner kernel 108. The initial measurement may be a baseline measurement. The application 114 may utilize the baseline measurement to compare to the device's 118 measurement and additional inner kernel 108 measurements to determine potential compromises. The initial measurement may be taken immediately after the inner kernel 108 and outer kernel 110 are loaded. In another example, the initial measurement may be taken as the inner kernel 108 and outer kernel 110 are loading. In such examples, the application 114 may be the first user process to launch. In another example, the baseline measurement may be generated while the system 102 is offline. In such examples, while the OS 106 is built (or while the OS 106 is loaded into memory 116), the system 102 may inspect the inner kernels 108 executable file to determine the baseline measurement. In such examples, the system 102 may embed the baseline measurement in the application 114. In another example, the application 114 may store the baseline measurement in the device 118. In such examples, the application 114 may retrieve the baseline measurement to determine whether a compromise may have occurred. Further, the application 114 may re-take the baseline measurement if the inner kernel 108 is upgraded.

As described above, the device 118 of FIG. 1 may be some electronic circuit that operates independently from the OS 106 of the system 102. The device may have a separate OS. In another example, the device may be a BMC. As described above, the BMC may have access to hardware of the system 102, such as the memory 116. In an example, the device 118 may measure the data structure in the memory 116. In a further example, the data structure in the memory 116 is the kernel space of the inner kernel 108. In another example, the application 114 running in the trusted execution environment 112 may provide the addresses of the data structure in memory 116 to the device 118. The device 118 may then measure the data structure in memory 116 using the provided addresses. In another example, the device 118 may continuously scan the data structure in memory 116 using the measurement engine 120. In other words, the measurement engine 120 of the device 118 may continuously measure the data structure in memory 116.

In another example, the device 118 may send a heartbeat signal to the application 114 running in the trusted execution environment 112. The heartbeat signal may include a timeout value. If the device 118 does not receive a response to the heartbeat signal within the timeout value, the device 118 may take corrective action. The corrective action may include restarting the system 102, re-imaging the system 102, downgrading firmware and software of the system 102, or some other action that may resolve the issue. In another example, before sending a heartbeat signal, the device 118 may establish secure communication with the application 114 running in the trusted execution environment 112. The secure communication between the device 118 and application 114 running in the trusted execution environment 112 may occur over an IOCTL interface, a REST API, or some other system software proxy to facilitate the communications As noted, the device 118 may establish secure communications with the application 114 running in the trusted execution environment 112. The device 118 may utilize a verification process to determine that the application 114 running in the trusted execution environment 112 is authentic and not a malicious program. The device 118 may request a key from the application 114. The application 114 may send an established key to the device 118. Any communication between the device 118 and the application 114 may be encrypted. The established key may be established at the time of the systems 102 manufacture. Once the device 118 establishes the authenticity of the application 114, secure communications may commence between the device 118 and the application 114. The application 114 may request measurements from the device 118. The device 118 may send the measurements upon request, as well as sending the heartbeat signal.

Figure 2:
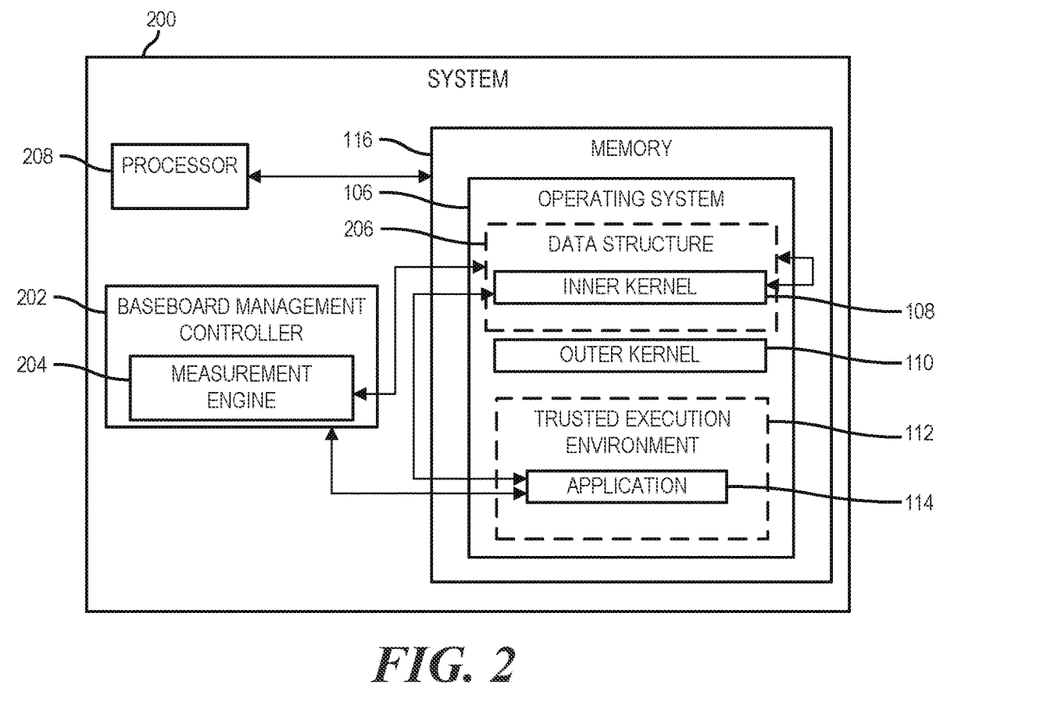
FIG. 2 is a block diagram of a system with a BMC and a processor which executes an OS stored in a memory.

FIG. 2 is a block diagram of a system 200 with a BMC 202 and a processor 208 which executes an OS 106 stored in a memory 116, according to one example. As noted above, the device 118 of system 102 may be a BMC 202. A BMC 202 may operate independently of a systems 200 OS 106, A BMC 202 may be a common and cheap component that may be included in many systems. As noted, a BMC 202 may have access to many components of the system 200, such as the memory 116. The BMC 202 may include a measurement engine 204 capable of measuring sections of memory 116 if given a range of memory addresses. In response to the given range of memory address, the BMC 202 may measure a section of memory 116 using the range of memory addresses. In FIG. 2, it is illustrated that the OS 106 is part of or loaded into the memory 116. Upon system 200 boot, routine code is executed that loads the OS 106 into the memory 116 of the system. The OS 106 may be composed of various sections of machine-readable instructions, including an inner kernel 108, outer kernel 110, and an application layer. The inner kernel 108 may execute in a set area of memory 116. As described above, the inner kernel 108 may be secure and may not be tampered with by other programs, such as programs running in the kernel space of the outer kernel or the application layer. While the inner kernel 108 may be secure, it may not truly be tamper proof. In the event that the inner kernel 108 is compromised, the measurements taken by the BMC 202 and inner kernel 108 of the kernel space of the inner kernel 108 may differ. The system 200 may also include a trusted execution environment 112. The trusted execution environment 112 may operate at the application layer of the OS 106. The application 114 may operate in the trusted execution environment 112.

In such examples, the application 114 operating in the trusted execution environment 112 may communicate with the inner kernel 108 and the BMC 202. The application 114 may request measurements of the data structure 206 in memory 116 from the inner kernel 108 and from the BMC 202, as described above. In response to the measurement request from the application 114, the BMC 202 may send the measurement of the data structure 206 in memory 116 to the application 114. The BMC 202 may also send a heartbeat signal or message to the application 114. The application 114 may send an acknowledgment or some other response to the BMC 202, in response to the heartbeat signal. In response to the measurement request from the application 114, the inner kernel 108 may also send a measurement of the data structure 206 to the application 114. In response to receiving measurements from the BMC 202 and the inner kernel 108, the application 114 may compare the measurements. In response to the measurements differing, the application 114 may take corrective action. The corrective action may include reimaging the system 200 with a last known good image, restarting the system 200, downgrading or updating the firmware and software of the system 200, identifying and removing malicious programs, or some other action to ensure that the system 200 is secure.

Figure 3:
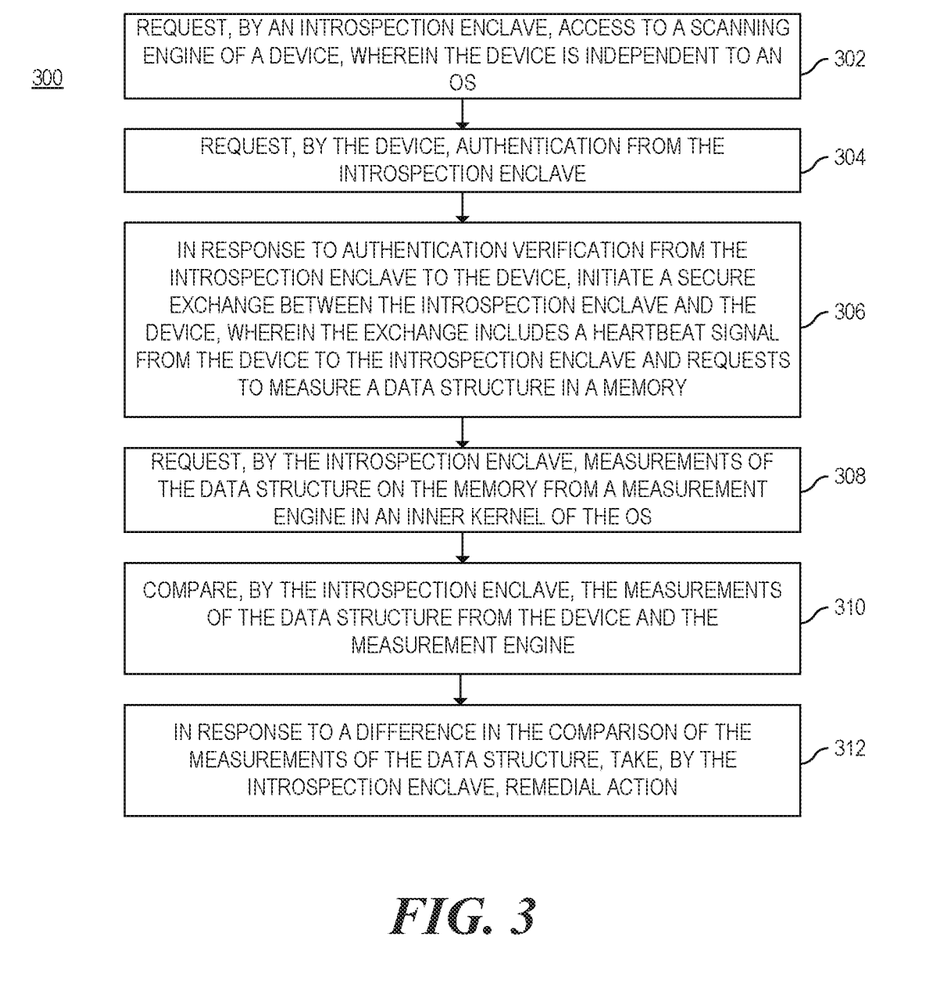
FIG. 3 is a flowchart of a method to compare measurements of a data structure in memory, according to one example.

FIG. 3 is a flowchart of a method to compare measurements of a data structure in memory, according to one example. Although execution of method 300 is described below with reference to the system 102 of FIG. 1, other suitable systems or modules may be utilized, including, but not limited to, system 200 or computing device 400. Additionally, implementation of method 300 is not limited to such examples.

At block 302, an introspection enclave may request access to a scanning engine of a device 118, wherein the device 118 is independent to an OS 106. In an example, a device may include a measurement engine 120 or a scanning engine. A measurement engine 120 and scanning engine may operate the same or similarly. For example, a measurement engine 120 may measure data structures upon request. In another example, the measurement engine 120 may continuously measure data structures. In other words, the measurement engine 120 may scan the data structure continuously. A scanning engine (for example, measurement engine 120) may measure a data structure continuously or at regular intervals. The scanning engine (e.g., measurement engine 120) may also measure a data structure at a time other than the regular interval, in response to a request for measurement from an application 114.

In another example, the application 114 may be an introspection enclave. An introspection enclave may be an application that verifies measurements provided by a kernel and by a device (e.g., device 118) operating independently of the systems 102 OS 106. The introspection enclave may operate at a higher privilege than other applications in a system 102. In other words, the OS 106 or other applications executing in the OS 106 may not tamper with the introspection enclave since the introspection enclave may be protected by the trusted execution environment 112. The introspection enclave may provide authentication to the device 118 or any other device that may request authentication. The authentication process utilized may include remote attestation, local attestation, or any other secure process or method to verify an applications authenticity.

As noted above, in block 302, the introspection enclave may request access to a device's 118 scanning engine. The introspection enclave may request access to start the process of data structure measurement comparison. The comparison may utilize measurements provided from at least two sources. In an example, one source is the device 118 scanning engine. To determine that the introspection enclave may be authentic and not compromised, the device 118 may request authentication from the introspection enclave.

At block 304, the device 118 may request authentication from the introspection enclave (e.g., the application 114). In response to a request from an introspection enclave to access the device 118, the device 118 may request authentication. In an example, the device 118 may send a random number (or some other shared secret) to the introspection enclave, the introspection enclave may send the number or secret to a report generator. The report generator may create a quote that includes a key generated using the number and a pre-agreed key derivation function. The report generator may send the quote to the introspection enclave and the introspection enclave may send the quote to the device 118. The device 118 may then verify the report by checking the key. If the key is as expected by the device 118 (based on the number or secret generated), the device 118 may initiate secure communication with the introspection enclave. Other methods may be utilized to authenticate the introspection enclave.

At block 306, in response to authentication verification from the introspection enclave to the device 118, a secure communication or exchange may be initiated between the introspection enclave and the device 118. The secure communication or exchange may include a heartbeat signal from the device 118 to the introspection enclave and requests from the introspection enclave to the device 118 to measure a data structure in a memory 116. Other communications may occur over the secure communication or exchange. The introspection enclave may schedule requests to the device 118 to measure the data structure in memory 116. The schedule may be stored in the device 118 or the introspection enclave. The schedule may include a request to measure the data structure in memory 116 (defined by a set of memory addresses included in the schedule by the introspection enclave), a time period for the device 118 to initiate the measurement, and a time period for when to send the measurement to the introspection enclave from the device 118

At block 308, the introspection enclave may request measurements of the data structure in the memory 116 from the device 118 and a measurement engine of an inner kernel 108 of an OS 106. The introspection enclave may request measurement of the data structure in the memory 116 from the measurement engine of the inner kernel 108. The data structure in memory 116 may be the kernel space of the inner kernel 108. In other words, the inner kernel may measure the data structure in memory 116 that the inner kernel 108 is operating in. The measurement engine of the inner kernel 108 may be the same as the measurement engine 120 of the device 118 or BMC. The measurement engine of the inner kernel 108 may be comprised of machine-readable instructions, hardware, or some combination thereof.

In another example, the device 118 may access or scan the memory in a system management mode. System management mode may be a mode where normal execution of programs (which may include the OS) executed by the processor of a system 102 may be hafted or suspended. During the suspension of execution, another program (for example, the measurement engine of the device 118) may execute at a higher privilege and scan or access memory of the system 102.

At block 310, the introspection enclave may compare the measurements of the data structure in memory 116 from the measurement engine 120 of the device 118 (e.g., a BMC) and the measurement engine of the inner kernel 108. For example, after the introspection enclave requests the measurements from the device 118 and the inner kernel 108, the introspection enclave may compare the measurements. In an example, the measurements of the data structure in memory 116 may be a measurement of the address space occupied by the inner kernel 108 or the kernel space of the inner kernel 108. As described above, the measurement of the data structure in memory 116 may include the size and contents of the inner kernel 108. In another example, the measurements may include data measured based on a range of given memory addresses. In such examples, the inner kernel space or the data structure in memory 116 where the inner kernel 108 operates may be defined by a specific and known set of memory addresses. In another example, the measurement may include the output of a cryptographic hash function. In such examples, the cryptographic hash function may take the memory addresses of the inner kernel 108 as an input. The cryptographic hash function may output a hexadecimal string based on the data in the memory addresses. In such examples, the device's 118 measurement engine 120 and the inner kernels 108 measurement engine may include the cryptographic hash function. In such examples, the input, for the cryptographic hash function of the device 118 and inner kernel 108, may be the memory addresses of the data structure in memory 116 (e.g., the inner kernel space). A compromise may be indicated if the output of the cryptographic hash function of the device 118 and inner kernel 108 do not match.

At block 312, in response to a difference in the comparison of the measurements of the data structure in memory 116, the introspection enclave may take remedial action. A deviation in measurements may indicate a compromise to the overall system 102. In such examples, the introspection enclave may take remedial action. For example, the introspection enclave may initiate a re-image of the system 102 with the last known good image. In another example, the introspection enclave may upgrade or downgrade (as in roll back) firmware and/or software installed on the system 102. In another example, the introspection enclave may initiate a system 102 restart. In another example, the introspection enclave may identify a malicious program and halt the programs execution. The introspection enclave may take other actions, not listed here, that corrects or resolves the cause of the deviation in measurements of the data structure in memory 116.

Figure 4:
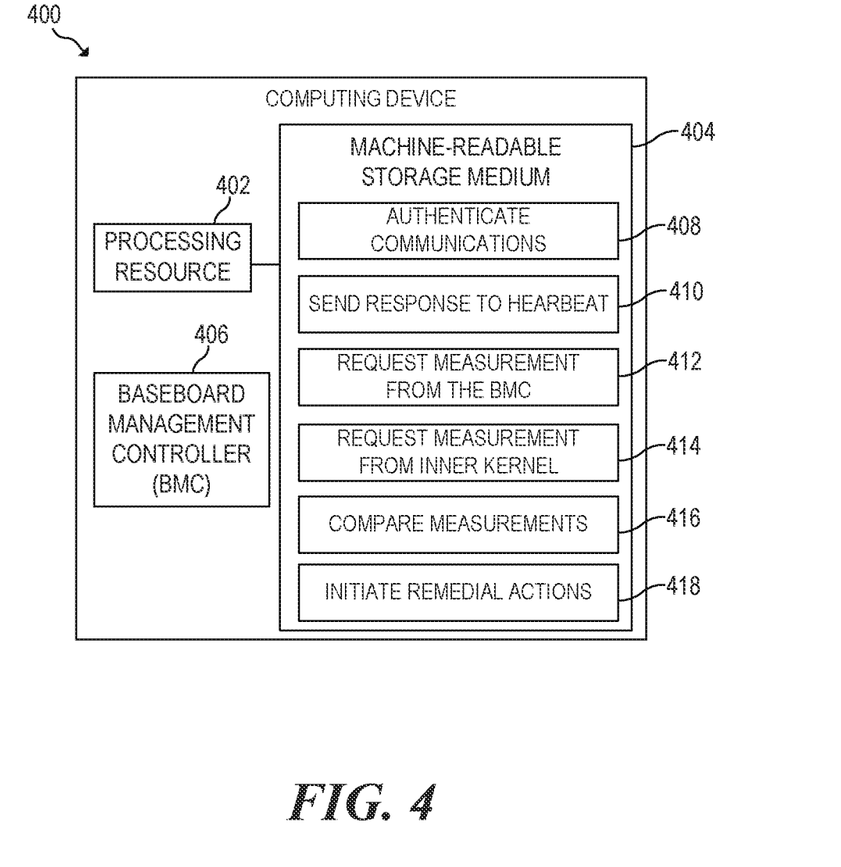
FIG. 4 is a block diagram of a computing device capable of comparing measurements of a data structure in memory, according to one example.
Figure 5:
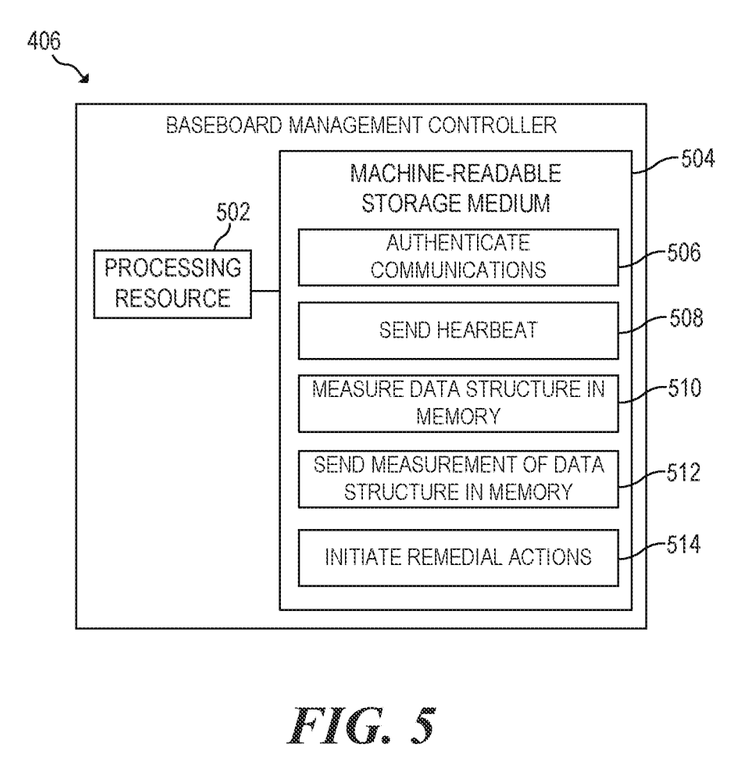
FIG. 5 is a block diagram of a baseboard management controller capable of measuring a data structure in a memory, sending a heartbeat signal, and taking remedial action if a signal is not received in response to the heartbeat signal.

FIG. 4 is a block diagram of a computing device capable of comparing measurements of a data structure in memory, according to one example. The computing device 400 may include a processing resource 402, a machine-readable storage medium 404, and a BMC 406. The processing resource 402 may execute instructions included in the machine-readable storage medium 404. The BMC 406 may execute instructions included in the BMC's 406 own machine-readable storage medium (as shown in FIG. 5). The machine-readable storage medium 404 of the computing device 400 may include instructions 408 to authenticate communications. In an example, the machine-readable instructions stored in the machine-readable storage medium 404 are a part of the instructions included in an application executing in a trusted execution environment. In a further example, the BMC 406 of the computing device 400 may operate indecently of the computing device's 400 OS. To ensure that the computing device 400 may not be comprised, communication between the BMC 406 and application may be authenticated. The communication between the BMC 406 and the application may be authenticated utilizing a remote or local attestation process, as described above. In response to authentication between the BMC 406 and application, the application may begin to request measurements from the BMC and the BMC may send a periodic heartbeat signal to the application to verify that the application may not be compromised.

The machine-readable storage medium 404 may include instructions 410 to send a response to a heartbeat signal. As noted above, the BMC 406 may send a heartbeat signal to the application. In response to the heartbeat signal, the instructions 410 may execute to send a response to the BMC 406. The BMC 406 may wait a specified time period to receive a response from the application. In the instance that the BMC 406 does not receive a response to the heartbeat signal, the BMC 406 may take corrective or remedial action, similar to the actions taken by the application in the case of a compromise. For example, the BMC 406 may re-image the computing device 400 with the last known good image, re-install firmware and/or software, downgrade firmware and/or software, upgrade firmware and/or software, or take some other action to correct the compromise.

The machine-readable storage medium 404 may include instructions 412 to request measurement from the BMC 406. The application may request measurements from the BMC 406 at any time. In another example, the application may be scheduled to request measurements from the BMC 406 at specified periods. In another example, the BMC 406 may continuously scan the memory for measurements and have measurements ready for any time the measurements are requested. In another example, the application may provide the memory addresses of the area of memory to be measured.

The machine-readable storage medium 404 may include instructions 414 to request measurements from the inner kernel of the computing device 400. In an example, the OS of the computing device may be a split kernel OS (as described above). The inner kernel may include a measurement engine to take measurements of a specific region in memory. The region in memory or data structure in memory may be the inner kernel space of the inner kernel.

The machine-readable storage medium 404 may include instructions 416 to compare the measurements received from the BMC 406 and inner kernel. The application, in response to receiving the measurements from the BMC 406 and the inner kernel, may compare the values. A deviation in measurement may indicate that the computing device 400 may be compromised.

The machine-readable storage medium 404 may include instructions 418 to initiate remedial actions. The application may compare the measurements from the BMC 406 and the inner kernel. As noted, the application may take remedial action in the instance that there is a deviation in the measurements. For example, the application may initiate a re-image of the computing device 400 with the last known good image. In another example, the application may upgrade or downgrade (as in roll back) firmware and/or software installed on the computing device 400. In another example, the application may initiate a restart of the computing device 400. In another example, the application may identify a malicious program and halt the programs execution. The application may take other actions, not listed here, that corrects or resolves the cause of the deviation in measurements of the data structure in memory.

FIG. 5 is a block diagram of a BMC 406 capable of measuring a data structure in a memory, sending a heartbeat signal, and taking remedial action if a signal is not received in response to the heartbeat signal. The BMC 406 may include a processing resource 502 and a machine-readable storage medium 504. The processing resource 502 may execute instructions included in the machine-readable storage medium 504. The machine-readable storage medium 504 may include instructions 506 to authenticate communications. As described above, the communications between the BMC 406 and the application may be secure. In order to ensure the security of the communication channel and authenticity of the application, the BMC may request that the application authenticate itself. The authentication process could be any process that allows for a third party to authenticate a program, as described above.

The machine-readable storage medium may include instructions 508 to send a heartbeat signal. In response to the authentication of the application, the BMC 406 may send a heartbeat signal to the application. The BMC 406 may set a timeout period for when to receive a response to the heartbeat signal. If a response is not received within the time period, the BMC 406 may initiate remedial actions. The BMC 406 may take corrective or remedial action, similar to the actions taken by the application in the case of a compromise. For example, the BMC 406 may re-image the computing device 400 with the last known good image, re-install firmware and/or software, downgrade firmware and/or software, upgrade firmware and/or software, or take some other action to correct the compromise.

The machine-readable instructions may include instructions 510 to measure a data structure in memory. In an example, the BMC 406 may receive requests to measure data structures in memory. In such examples, in response to the reception of a request to measure a data structure in memory, the BMC 406 may measure the data structure in memory. In an example, the BMC 406 may receive the memory addresses to measure or scan in the request. In another example, the BMC 406 may receive the memory addresses to measure or scan upon initialization of the computing device 400. In such examples, once the BMC 406 receives the memory addresses, the BMC 406 may measure or scan the data structure in memory continuously.

The machine-readable instructions may include instructions 512 to send the measurement of the data structure in memory. In response to the reception of the request to measure or scan the data structure in memory and upon completion of the measurement of the data structure in memory, the BMC 406 may send the measurements to the application. In another example, the BMC 406 may store the measurements in the machine-readable storage medium 504.

The machine-readable instructions may include instructions 514 to initiate remedial actions. As described above, in response to a failure to receive a response to the heartbeat signal, the BMC may take corrective or remedial action, similar to the actions taken by the application in the case of a compromise. For example, the BMC 406 may re-image the computing device 400 with the last known good image, re-install firmware and/or software, downgrade firmware and/or software, upgrade firmware and/or software, or take some other action to correct the compromise.

Although the flow diagram of FIG. 3 shows a specific order of execution, the order of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present disclosure.

The present disclosure has been described using non-limiting detailed descriptions of examples thereof and is not intended to limit the scope of the present disclosure. It should be understood that features and/or operations described with respect to one example may be used with other examples and that not all examples of the present disclosure have all of the features and/or operations illustrated in a particular figure or described with respect to one of the examples. Variations of examples described will occur to persons of the art. Furthermore, the terms "comprise," "include," "have" and their conjugates, shall mean, when used in the present disclosure and/or claims, "including but not necessarily limited to."

It is noted that some of the above described examples may include structure, acts or details of structures and acts that may not be essential to the present disclosure and are intended to be examples. Structure and acts described herein are replaceable by equivalents, which perform the same function, even if the structure or acts are different, as known in the art. Therefore, the scope of the present disclosure is limited only by the elements and limitations as used in the claims.

What is claimed is:

1. A method comprising:
   requesting, by an introspection enclave (IE), access to a scanning engine of a device, wherein the device is independent to an OS;
   requesting, by the device, authentication from the IE;
   in response to authentication verification from the IE to the device, initiating a secure exchange between the IE and the device, wherein the exchange includes a heartbeat signal from the device to the IE and requests for the device to measure a data structure in a memory;
   requesting, by the IE, measurements of the data structure in the memory from a measurement engine in an inner kernel of the OS;
   comparing, by the IE, the measurements of the data structure from the device and the measurement engine; and
   in response to a difference in the comparison of the measurements of the data structure, taking, by the IE, remedial action.

2. The method of claim 1, further comprising:
   measuring continuously, by the scanning engine of the device, the data structure in memory.

3. The method of claim 1, wherein communication between the IE and the device is encrypted.

4. The method of claim 1, wherein the device access's the memory to measure the data structures in memory through a system management mode.

5. The method of claim 1, wherein the inner kernel is a part of a kernel and the inner kernel runs critical security functions.

6. A non-transitory machine-readable storage medium encoded with instructions executable by a processor, the non-transitory machine-readable storage medium comprising, instructions to:
   authenticate communication to and from a baseboard management controller (BMC);
   in response to a reception of a heartbeat signal from the BMC, send a response to the BMC;
   request, from the BMC, measurement of a data structure in memory;
   request, from a measurement engine of an inner kernel, measurement of the data structure in the memory;
   compare the measurements of the data structure in the memory from the BMC and from the measurement engine; and
   in response to a difference in comparison of the measurements of the data structure in the memory from the BMC and from the measurement engine, initiate remedial action.

7. The non-transitory machine-readable storage medium of claim 6, wherein, in response to a failure to respond to the heartbeat signal, the BMC to initiate remedial action.

8. The non-transitory machine-readable storage medium of claim 6, wherein the OS includes the inner kernel and an outer kernel.

9. The non-transitory machine-readable storage medium of claim 8, wherein the instructions are executed in a trusted execution environment within the outer kernel of the OS.

10. The method of claim 1, further comprising:
    requesting, by the IE, second measurements of the data structure in the memory, at different times, from a measurement engine in an inner kernel of the OS;
    comparing, by the IE, the second measurements of the data structure from the device and the measurement engine; and
    in response to a second difference in the comparison of the measurements of the data structure, taking, by the IE, further remedial action.

* * * * *